US008332520B2

(12) United States Patent
Hanai et al.

(10) Patent No.: US 8,332,520 B2
(45) Date of Patent: Dec. 11, 2012

(54) WEB SERVER FOR MANAGING SESSION AND METHOD THEREOF

(75) Inventors: Shisei Hanai, Tokyo (JP); Shuhichi Murai, Machida (JP)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 12/014,996

(22) Filed: Jan. 16, 2008

(65) Prior Publication Data

US 2008/0177883 A1    Jul. 24, 2008

(30) Foreign Application Priority Data

Jan. 19, 2007    (JP) .................................... 2007-9726

(51) Int. Cl.
*G06F 15/16* (2006.01)
*G06F 15/173* (2006.01)
*G06F 21/00* (2006.01)
*H04L 9/32* (2006.01)

(52) U.S. Cl. ........ 709/227; 709/225; 709/226; 713/172; 713/182

(58) Field of Classification Search ................. 709/225, 709/226, 227; 713/172, 182
See application file for complete search history.

(56) References Cited

U.S. PATENT DOCUMENTS

| 2002/0138660 | A1* | 9/2002 | Eilers et al. | 709/313 |
|---|---|---|---|---|
| 2003/0055977 | A1* | 3/2003 | Miller | 709/227 |
| 2003/0105805 | A1 | 6/2003 | Jorgenson | |
| 2004/0122961 | A1 | 6/2004 | Rouault | |
| 2004/0123015 | A1* | 6/2004 | Durr et al. | 711/5 |
| 2005/0154873 | A1* | 7/2005 | Cam-Winget et al. | 713/150 |

FOREIGN PATENT DOCUMENTS

| CN | 1226702 A | 8/1998 |
|---|---|---|
| JP | 2002334057 A | 11/2002 |
| JP | 2004206695 | 7/2004 |
| JP | 2005321970 | 11/2005 |
| JP | 2006011739 | 1/2006 |
| WO | WO2008088026 A1 | 7/2008 |

OTHER PUBLICATIONS

Masahiro Satoh "Cookie Structure and Example Use of CGI", Open Design, vol. 6, No. 1, CQ Publishing Co., Ltd. Feb. 1, 1999.
Masahiro Satoh "Cookie Structure and Example Use of CGI", Open Design, vol. 6, No. 1, CQ Publishing Co., Ltd. Feb. 1, 1999 Abstract.

(Continued)

*Primary Examiner* — Peter Shaw
(74) *Attorney, Agent, or Firm* — Jordan IP Law, LLC (57) ABSTRACT

A web server that can be flexibly changed may include storage for a session state; a reception unit for receiving the session state while associating it with a primary HTTP request, from a terminal; storage for the received session state which is accessed as an HTTP session object by a processing program for responsive to the received primary HTTP request; a unit for accessing the stored session state responsive to executing an access instruction contained in the processing program; and a return unit for reading the session state from the storage unit responsive to executing an instruction generating an HTTP response contained in the processing program, setting the session state to the primary HTTP response as a parameter to be transmitted by the terminal in association with a secondary HTTP request, and returning the set primary HTTP response to the terminal.

10 Claims, 9 Drawing Sheets

OTHER PUBLICATIONS

Takao Fukuda "Future Beats Contracts Development to a Specialist Integration Firm with a Development Framework, and Realizes Additional Functionality with Ease". Nikkei Internet Technology, No. 58, Nikkei Business Publications, Inc. Apr. 22, 2002.

Takao Fukuda "Future Beats Contracts Development to a Specialist Integration Firm with a Development Framework, and Realizes Additional Functionality with Ease". Nikkei Internet Technology, No. 58, Nikkei Business Publications, Inc. Apr. 22, 2002 Abstract.

Outline of DB2 Alphablox (http://www-06.ibm.com/jp/software/data/bi/alphablox), DB2, developerWorks, PartnerWorld Corporation.

Outline of DB2 Alphablox (http://www-06.ibm.com/jp/software/data/bi/alphablox), DB2, developerWorks, PartnerWorld Corporation. Abstract.

Martin Fowler, "Patterns of Enterprise Application Architecture", Amazon.com books introcution, homepage URL "http://www.amazon.com/exec/obidos/ASIN/0321127420" Chapter 17, Session State Patterns. Feb. 12, 2006 Abstract.

WebSphere Application Server Network Deployment Version 5.1 InfoCenter. Session Administration Support (http://publib.boulder.ibm.com/infocenter/wasinfo/v5r1//topic/com.ibm.websphere.nd.doc/info/ae/ae/cprs_sesm.html).

WebSphere Application Server Network Deployment Version 5.1 InfoCenter. Session Administration Support (http://publib.boulder.ibm.com/infocenter/wasinfo/v5r1//topic/com.ibm.websphere.nd.doc/info/ae/ae/cprs_sesm.html) Abstract.

Web 2.0 Data Warehouse Environments, Inline Analytic Made Possible by DB2 Alphablox (http://www-06.ibm.com/jp/domino01/mkt/dminfo.nsf/doc/00825839).

Web 2.0 Data Warehouse Environments, Inline Analytic Made Possible by DB2 Alphablox (http://www-06.ibm.com/jp/domino01/mkt/dminfo.nsf/doc/00825839) Abstract.

Bacon J et al: "Mobile Applications for Ubiquitous Environments", The ICL Systems Journal, International Computers Limited, GB, vol. 12, No. 2, Nov. 1, 1997, pp. 264-287.

Arun Iyengar: "Dynamic Argument Embedding: Preserving State on the World Wide Web", IEEE Internet Computing, IEEE Service Center, New York, NY, US, Mar. 1, 1997, pp. 50-56.

Saracco C M et al.: "Enabling distributed enterprise integration with WebSphere and DB2 Information Integrator", IBM Systems Journal, IBM Corp., Armonk, NY, US, vol. 43, No. 2, Jan. 1, 2004, pp. 255-369.

Supplementary European Search Report, EP 08 70 3399, May 12, 2010.

English Translation of Abstract of CN1226702A, Published Aug. 25, 1998.

* cited by examiner

WEB SERVER FOR MANAGING SESSION AND METHOD THEREOF

FIELD OF THE INVENTION

The present invention relates to a web server. Particularly, the present invention relates to the web server for managing a session, and a method thereof.

BACKGROUND

In recent years, in order to realize various web pages, web servers incorporate functions of managing sessions. According to this function, a user can not only browse the requested web page, but also log in his/her private page to refer to a history of previous accesses or to perform the following operation based on the history. Session management is realized by saving a session state which indicates progress of processing by the web server for every user.

For example, in JavaEE (Java Enterprise Edition: Java is a registered trademark), the session state is stored in a storage device of the web server and referred to as an Hyper Text Transfer Protocol (HTTP) session object by a servlet program operated on the web server.

When a website becomes large in scale, a single web server is insufficient in terms of processing capability, so that it is realized by a plurality of web servers. In this case, the HTTP requests, which are sequentially received, are processed by being distributed to respective web servers. Hence, a plurality of HTTP requests received from the same user may reach different web servers, respectively. In this case, a session state is stored only in the web server which has received the previous HTTP request, so that the session state cannot be referred to in the processing in accordance with the following HTTP request.

Meanwhile, the function is used in which the session state is shared by the plurality of web servers (see WebSphere Application Server Version 5.1 InfoCenter, Description of session management support, homepage URL "http://publib-.boulder.ibm.com/infocenter/wasinfo/v5rl//topic/com.ibm-.websphere.nd.doc/in fo/ae/ae/cprs_sesm.html", searched on Jan. 10, 2007). In this function, however, the session state which should be shared among the web servers cannot be selected efficiently, and thus communication cost or processing may be increased. In addition, an applicable range of this function is limited; for example, it is not applicable to a system which employs a database as considered in "Brief description of DB2 Alphablox", homepage URL http://www-06.ibm.com/jp/software/data/bi/alphablox/, searched on Jan. 10, 2007. Meanwhile, the technique is used which avoids this problem by storing the session state as a cookie or the like in a web browser of a terminal device, instead of the web server (see "Patterns of Enterprise Application Architecture," by Martin Fowler, Amazon.com books introduction, homepage URL "http://www.amazon.com/exec/obidos/ASIN/ 0321127420", searched on Jan. 10, 2007, and see also Japanese Unexamined Patent Publication (Kokai) No. 2004-206695).

In this technique, the session state stored in the terminal device is transmitted to the web server in association with the following HTTP request. This session state is referred to as an accompanying parameter to the HTTP request from a servlet program. However, many other parameters may be set to the HTTP request, so that it is difficult for an engineer to determine which parameter is the session state by referring to the program. This may lead to decrease in efficiency of development or maintenance of the servlet program. In addition, since an interface for accessing the session state also completely differs from that for an HTTP session object, it is also difficult to change a storage location of the session state from the web server to the terminal device due to specification change. Refer to "The DWH environment of Web 2.0 era!" Brief description of Inline Analytic realized by DB2 Alphablox, homepage URL "http://www-06.ibm.com/jp/domino01/mkt/dminfo.nsf/doc/00825839", searched on Jan. 10, 2007.

SUMMARY

Therefore, it is an object of the present invention to provide a web server, a system, a method, and a program product, which can solve above-mentioned problems. This object is achieved by the combinations of the features described in the independent claims. The dependent claims define further advantageous examples of the present invention.

In order to solve the foregoing problems, in one aspect of the present invention, there is provided a web server including: a storage unit for storing a session state which indicates progress of processing in response to a plurality of HTTP requests sequentially received from a terminal device; a reception unit for receiving the session state in association with a primary HTTP request, from the terminal device; a storing unit for storing the received session state in a storage area of the storage unit, which is accessed as an HTTP session object by a processing program for performing processing in response to the received primary HTTP request; an access unit for accessing the stored session state in response to execution of an instruction to access the HTTP session object, which is contained in the processing program; and a return unit for reading the session state from the storage unit in response to execution of an instruction to return a primary HTTP response, contained in the processing program, setting the session state to the primary HTTP response as a parameter to be transmitted by the terminal device in association with a secondary HTTP request, and returning the set primary HTTP response to the terminal device. There is also provided a method of performing processing in response to the HTTP request by the web server, a program for causing an information processor to operate as the web server, and a system provided with a plurality of web servers. Note herein that the above brief description of the invention does not list all the necessary features of the present invention, but sub-combinations of a group of these features may also constitute the invention.

DETAILED DESCRIPTION

While the present invention will be described hereinafter through the best modes for carrying out the invention (hereinafter referred to as embodiments), the embodiments below do not limit the invention according to the claims, and all the combinations of features described in the embodiments are not necessarily indispensable to the solving means of the invention.

Figure 1:
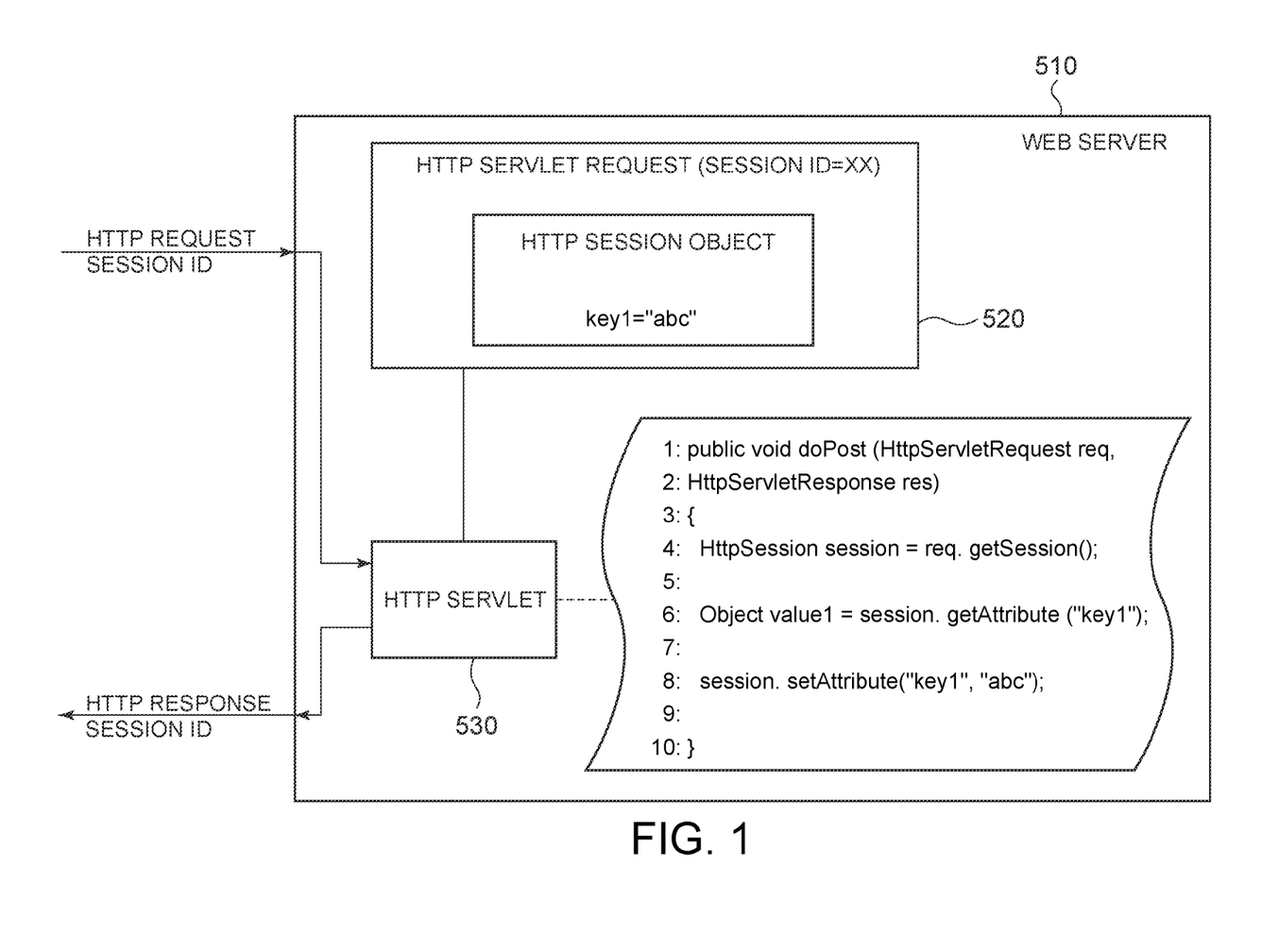
FIG. 1 schematically shows functions of a web server 510 as a web server which applies a first configuration.

FIG. 1 schematically shows functions of a web server 510 as a web server which applies a first configuration. In this configuration, a session state is stored in the web server 510. Operation in accordance with an HTTP request is as follows. First, the web server 510 receives the HTTP request in association with a session ID. An HTTP servlet request object corresponding to the received session ID is searched, and given to an HTTP servlet 530. This searched object is considered as an HTTP servlet request object 520. The operation so far is automatically performed by middleware, which is compliant with JavaEE (Java Enterprise Edition) or the like, for example. Then, based on a servlet program created by a developer of an application program, the HTTP servlet 530 starts to operate.

As shown in the first line of a program code in the drawing, the HTTP servlet request object is referred to using an argument "req" on a servlet program, which realizes the HTTP servlet 530. As shown in the fourth line, by calling a method "getSession" for the "req", the HTTP session object is read from the HTTP servlet request object. This object is an entity of the session state. The session state is expressed, as shown in the drawing for example, by the combination of a key name, such as "key1", and a character string "abc", which is a value thereof. It is referred to from the servlet program as a variable "session."

As shown in the sixth line, by calling a method "getAttribute" for "session", the value is read from the HTTP session object. In this servlet program, the read value is assigned to a variable "value". As shown in the eighth line, by calling a method "setAttribute" for "session", the value of the HTTP session object is updated. In this servlet program, the value of the key "key1" is updated to "abc". When returning a HTTP response, the HTTP servlet 530 transmits the HTTP response along with the session ID associated therewith, which has been received upon receiving the HTTP request.

In the first configuration shown in FIG. 1, the entity of the session state is stored in the web server 510. In order to enable the correct session state to be referred to in the processing in response to the request, the request is transmitted along with the session ID associated therewith. In this manner, in the first configuration, a series of processing in response to a plurality of requests also can be managed as the session by associating them with each other. However, a disadvantage arises when a website is realized by a plurality of web servers including the web server 510. In other words, even in the case where the correct session ID is transmitted, the session state based on the previous processing cannot be read if the request reaches the web server different from that which has performed the previous processing.

Figure 2:
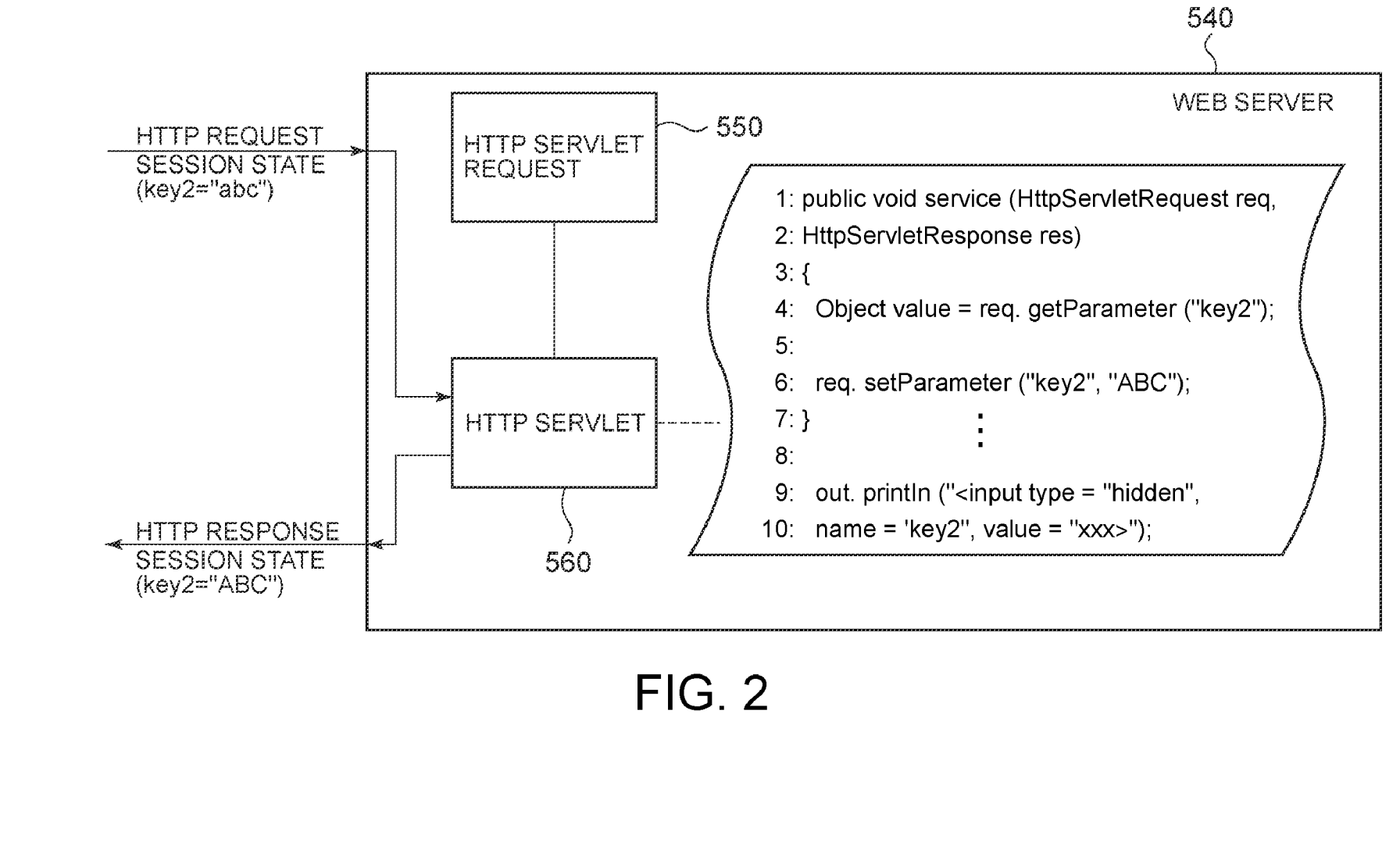
FIG. 2 schematically shows functions of a web server 540 as the web server which applies a second configuration.

For solving this problem, a second configuration shown in FIG. 2 below provides the session state on a terminal device side. FIG. 2 schematically shows functions of a web server 540 as the web server which applies the second configuration. In this configuration, the session state is stored in the terminal device as a cookie or the like. The operation in accordance with the HTTP request is as follows. First, the web server 540 receives the HTTP request in association with the session state. Unlike the case of FIG. 1, what is received here is the entity of the session state, instead of the session ID. The session state is set by being added to other parameters set in the HTTP request. Other parameters here indicate an attribute of a request for the website, including an ID and quantity of a product to be purchased, for example, in the case where the website is for merchandising. In other words, the session state is set to the HTTP request along with these parameters and received. The operation so far is automatically performed by the middleware, which is compliant with JavaEE or the like, for example. Then, an HTTP servlet 560 starts to operate based on the servlet program.

As shown in the first line of the program code in the drawing, an HTTP servlet request object 550 is referred to using the argument "req" on the servlet program, which realizes the HTTP servlet 560. To this object, all the parameters received in association with the HTTP request are set. As shown in the fourth line, by specifying the key name of the parameter to call a method "getParameter" for the object "req", the parameter specified by the key name is read. In this program example, "key2" which indicates the session state is specified, so that a value "abc" of the session state is read and assigned to the variable "value". In addition, as shown in the sixth line, by calling a method "setParameter" for the object "req", a specified value is assigned to the specified key. Moreover, as shown in the ninth to tenth lines, by embedding the session state in the web page to return as the HTTP response, the session state can be transmitted again in association with the following HTTP request.

In this manner, also in the second configuration, the session state can be stored on the terminal device side while appropriately referred to from the servlet program on a web server side. However, with this configuration, a disadvantage may arise in terms of the efficiency of the development and maintenance of the servlet program. In other words, the session state is referred to as one of the parameters of the HTTP request on the purport of a text of the servlet program. In addition, other various attributes accompanied to the original request may be set to the HTTP request as the parameters. These parameters which indicate the attributes and the parameters which indicate the session states are identified only by the key name of the parameter. Hence, it is difficult for the developer or maintenance personnel of the program to determine which parameter indicates the session state, if he/she does not know the key name of the parameter which indicates the session state. This disadvantage becomes more significant if the website becomes larger in scale and if the number of engineers increases who are involved in the development or maintenance. In other words, since the session state is not explicit only from referring to the text of the program, it is necessary to sufficiently share information using other means, such as specification.

As described, the session state can be managed according to the first or second configuration, however, it may not be appropriate for constituting a large scale and complicated website in recent years. In contrast, according to a configuration which will be described by referring to FIGS. 3 to 9, the session state is managed on the terminal device side, and the efficiency of the development and maintenance of the program can be significantly improved. Hereinafter, it will be described specifically.

Figure 3:
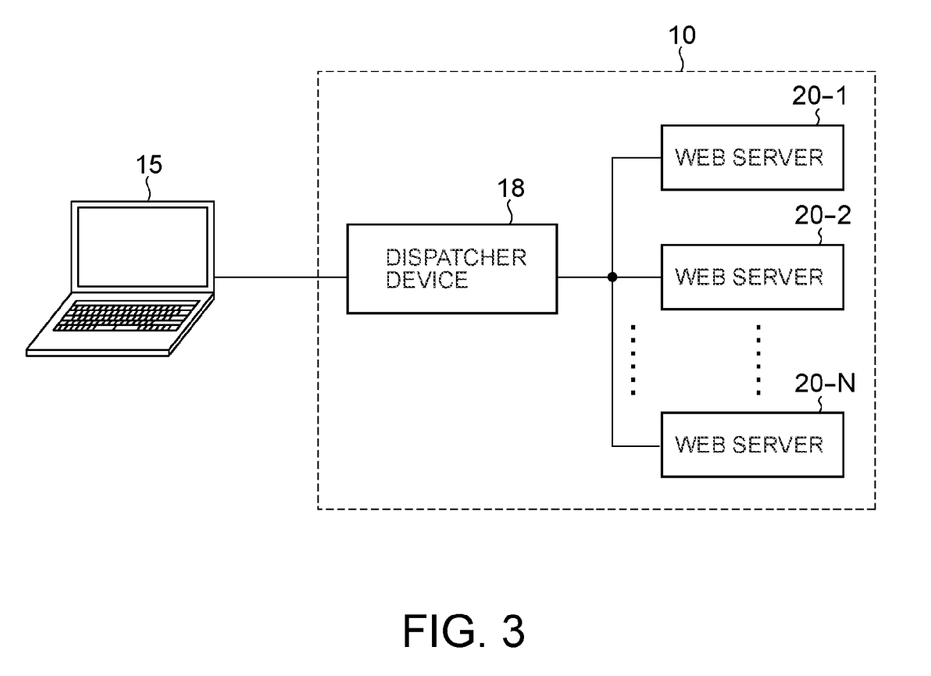
FIG. 3 shows an overall configuration of an information system 10 according to this embodiment.

FIG. 3 shows an overall configuration of an information system 10 according to this embodiment. The information system 10 is provided with a dispatcher device 18 and web servers 20-1 to 20-N, and is intended to return the HTTP response in response to the HTTP request received from an external terminal device 15. The dispatcher device 18 selectively assigns the HTTP requests received from the terminal device 15 to any of the web servers 20-1 to 20-N. Specifically, the dispatcher device 18 transfers a HTTP request received from the terminal device 15 to a web server, which is selected from the web servers 20-1 to 20-N using a round robin method or the like, for example. When a HTTP request is received, each of the web servers 20-1 to 20-N performs processing in response to the request, creates a HTTP response based on the processing result, and returns it to the terminal device 15.

Figure 4:
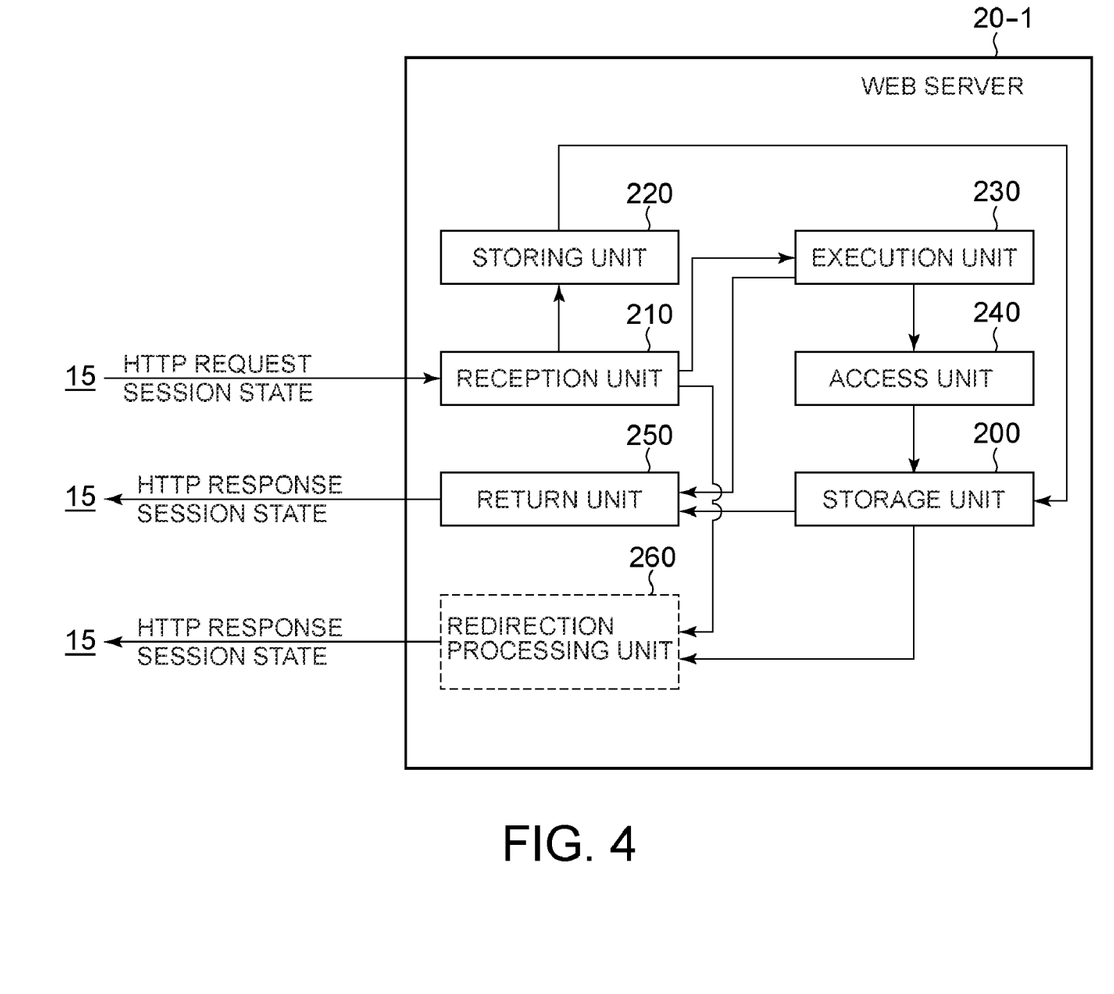
FIG. 4 shows a functional configuration of a web server 20-1 according to this embodiment.

FIG. 4 shows a functional configuration of the web server 20-1 according to this embodiment. The web server 20-1 is provided with a storage unit 200, a reception unit 210, a storing unit 220, an execution unit 230, an access unit 240, and a return unit 250. First, the relation between each of these members and hardware resources will be described. The storage unit 200 is realized by a storage device, such as a RAM 1020 or hard disk drive 1040, which will be describe later. The reception unit 210 and the return unit 250 are realized by the combination of hardware devices, such as a communication interface 1030, described later, and a CPU 1000 for executing the middleware, such as JavaEE. The storing unit 220 and the execution unit 230 are realized by causing the servlet program to operate on the middleware by the CPU 1000. The access unit 240 is realized by causing the CPU 1000 to operate a program, called a class library, installed along with the middleware, such as JavaEE.

The storage unit 200 is provided for storing a session state which indicates progress of processing in response to a plurality of HTTP requests sequentially received from the terminal device 15. The reception unit 210 receives the session state from the terminal device 15 in association with a primary HTTP request. The storing unit 220 stores the received session state in a storage area within the storage unit 200, which is accessed as an HTTP session object by a processing program performing processing in response to the received primary HTTP request. The storing unit 220 is realized by an object referred to as a filter class, for example, which operates when the servlet program operates but prior to the start of operation of the servlet program. In other words, the storing unit 220 starts the operation before the servlet program starts the operation by the execution part 230, which will be described later, and stores the session state in the storage unit 200.

The execution unit 230 executes the servlet program which is the processing program. During this execution, there is a case in which an instruction to access the HTTP session object may be executed. This instruction is an instruction to call a method to access the HTTP session object, and in JavaEE, for example, this instruction is a call of "getSession" method or "setSession" method. In response to such a call, the access unit 240 accesses the session state stored in the storage unit 200. The access means reading or writing, and thereby the session state can be updated.

During the execution of the servlet program, the instruction to return a primary HTTP response corresponding to the primary HTTP request may be executed. This instruction is the instruction to call a method "println" or the like for outputting the character string, for an output stream indicating the HTTP response (for example, an out object of JavaEE). As other examples, this instruction may be the web page itself described in JSP (Java Server Pages) or the like. This is because the web page in JSP is executed by being converted to the instruction to return contents of the page as the HTTP request.

In response to the execution of such an instruction, the return unit 250 reads the session state from the storage unit 200. The session state to be read may have been changed from that when it was received by the function of the access unit 240, for example. The return unit 250 sets this read session state to the primary HTTP response as a parameter to be transmitted by the terminal device 15 in association with a secondary HTTP request, and returns the set primary HTTP response to the terminal device 15. It is desirable that this parameter is a parameter which is not displayed on the web page displayed by the terminal device 15, which receives the primary HTTP response. It is also desirable that this parameter is a parameter which is transmitted in association with a secondary HTTP request in accordance with manipulation by a user for the web page. The manipulation by the user herein is, for example, the manipulation of pressing down a "Submit" button, an "OK" button, or "Next" button, or the like. Thereby, the latest session state can be transmitted in association with the secondary HTTP request. Since the configuration of each of the web servers 20-2 to 20-N is substantially the same as that of the web server 20-1, the description thereof is omitted.

With the configuration described above, the session state can be appropriately managed on the terminal device 15 side instead of on the web server 20-1. Thereby, even in the case where the secondary HTTP request from the terminal device 15 reaches the web server 20-2, instead of the web server 20-1, the web server 20-2 can appropriately refer to the latest session state to continue the normal processing. In addition, from the servlet program executed by the execution unit 230, the session state is distinguished from the parameters of the HTTP request and can be referred to as the HTTP session object. Thereby, even in the case where the website is large in scale and the servlet program is complicated, the engineer can clearly recognize the session state by referring to the program. Since the session state is not displayed on the web page, it is possible for the user of the website to not experience any discomfort.

Next, there will be described processing functions in the case where the website applies Ajax (Asynchronous JavaScript+XML). In this case, without the user manipulating the button on the web page, a JavaScript program contained in the web page automatically transmits the request by XMLHTTP communication to the web server 20-1 in response to the operation by the user moving a mouse cursor, for example. As a result, the access unit 240 may update the session state stored in the storage unit 200 in response to the request by the XMLHTTP communication, after returning the primary HTTP response and before receiving the secondary HTTP request.

In such a case, although the latest session state after the updating has been stored in the storage unit 200, the session state to be transmitted to the web server 20-1 in association with the following secondary HTTP request is the old session state. As a result, the latest session state is overwritten by the received old session state with the operation of the storing unit 220, and the session cannot continue correctly. In order to avoid such a disadvantage, it is desirable for the web server 20-1 to be further provided with a redirection processing unit 260 if the website applies Ajax. The return unit 250 returns the primary HTTP response to the terminal device 15, which causes the terminal device 15 to request redirection processing as the secondary HTTP request.

Upon receiving this, the terminal device 15 returns the secondary HTTP request for requesting the redirection processing to the web server 20-1 in response to the manipulation of the user. The redirection processing unit 260, when the request is received, reads the session state from the storage unit 200. The redirection processing unit 260 then sets the session state to the secondary HTTP response to be returned, as the parameter to be transmitted by the terminal unit 15 in association with the following third HTTP request. The redirection processing unit 260 then returns the set secondary HTTP response. Upon receiving this, the terminal unit 15 immediately transmits the third HTTP request. It is not known as to which of the web servers 20-1 to 20-N that this request reaches. However, this third HTTP request has the latest session state associated therewith. For this reason, when the third HTTP request is received, the reception unit 210 can store the corresponding received session state in the storage unit 200. In this manner, by providing the redirection processing unit 260, the session can be appropriately maintained even in the website which applies Ajax.

Figure 5:
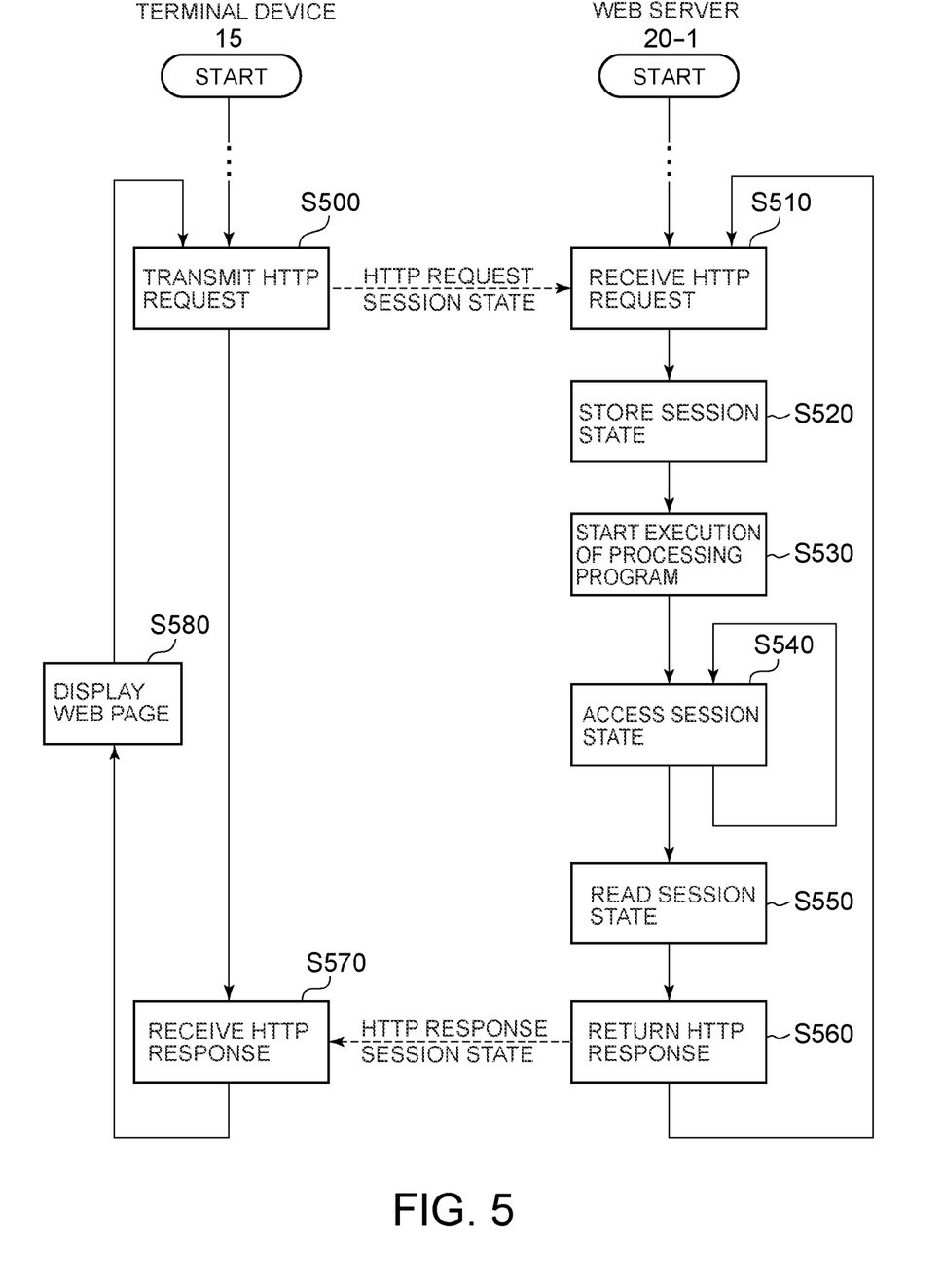
FIG. 5 shows procedure of the web server 20-1 according to this embodiment to communicate with a terminal device 15.

FIG. 5 shows procedure of the web server 20-1 according to this embodiment to communicate with the terminal device 15. In FIG. 5, there will be described the processing related to the website which does not apply Ajax. The terminal device 15, when the manipulation by the user for the web page which is already displayed is received, transmits the primary HTTP request in association with the session state to the web server 20-1 (S500). This session state is that set as the parameter to be transmitted in association with the following HTTP request among the data of this already-displayed web page. Corresponding to this, the reception unit 210 receives the primary HTTP request in association with the session state (S510).

Next, the storing unit 220 stores this received session state in the storage area in the storage unit 200, which is accessed as the HTTP session object by the processing program performing the processing in response to the received primary HTTP request (S520). The session state may be overwritten or may be added. In other words, the storing unit 220 may store this session state newly received by the reception unit 210, instead of the session state which has been already stored in the storage area. The storing unit 220 may also store this session state newly received by the reception unit 210, in addition to the session state which has been already stored in the storage area.

Next, the execution unit 230 starts the execution of the servlet program which is the processing program. When the instruction to access the HTTP session object is executed during the course of the execution, the access unit 420, in response thereto, accesses the session state stored in the storage unit 200 (S540). Depending on contents of the processing of the program, the number of accesses may be plural. When the instruction to return the primary HTTP response is executed during the course of the execution of the servlet program, the return unit 250, in response thereto, reads the session state from the storage unit 200 (S550). Then, the return unit 250 performs serialization processing for the read session state.

The serialization processing is the processing to relocate the data, such as the session state, or enable it to be transmitted to an external device via a communication line, the data being stored in an address space in the storage unit 200. Specifically, it is performed as follows. The storage unit 200 stores a data group including a plurality of data units as the session state, wherein these data units may be associated with each other by a structure referred to as a list structure. For example, first data among these data units is referred to from second data using a storage location address of the first data. In this case, when the first and second data is read and stored in a different address, the storage location address of the first data is changed. As a result, the actual storage location address becomes different from the storage location address used for being referred to from the second data.

For this reason, the return unit 250 performs conversion for these data groups so that the first data is referred to from the second data without using the storage location address of the first data. As an example, a data structure of the data group may be converted from the list structure to an array structure, or the data used for referring to the first data from the second data may be changed from the storage location address to a data identifier. In addition, the processing, such as conversion of a character code of the character string or conversion of a numerical format of numerical information, may be performed as the serialization processing.

In addition, the return unit 250 may further perform the conversion including at least either one of encryption processing and data compression processing, for the data group which has been serialized. According to the encryption processing, it can inhibit the session state, which originally does not need to be opened to a third party, to be referred to in the units of the terminal device 15 or on a communication route, resulting in an illegal tapping act being prevented in advance. The session state, which has undergone the serialization and data compression/encryption, is set to the primary HTTP response. As other processing, the return unit 250 may perform the processing for releasing the storage area, which stores the read session state, to other applications. This processing is not the explicit processing on the text of the servlet program, and may be performed asynchronously with the servlet program by a garbage collector. The return unit 250 then returns the primary HTTP response to the terminal device 15 (S560).

The terminal unit 15 displays the web page contained in the response to the user, when the primary HTTP response is received (S580). When the user manipulates the button on the web page, the secondary HTTP request is transmitted (S500). The subsequent processing is similar to that described above as S500 to S580. However, this secondary HTTP request does not always reach the web server 20-1, and it may reach any of the web servers 20-2 to 20-N. Since the latest session state is transmitted in association with the secondary HTTP request in such a case as well, the web server which receives the request can appropriately continue the processing.

Figure 6:
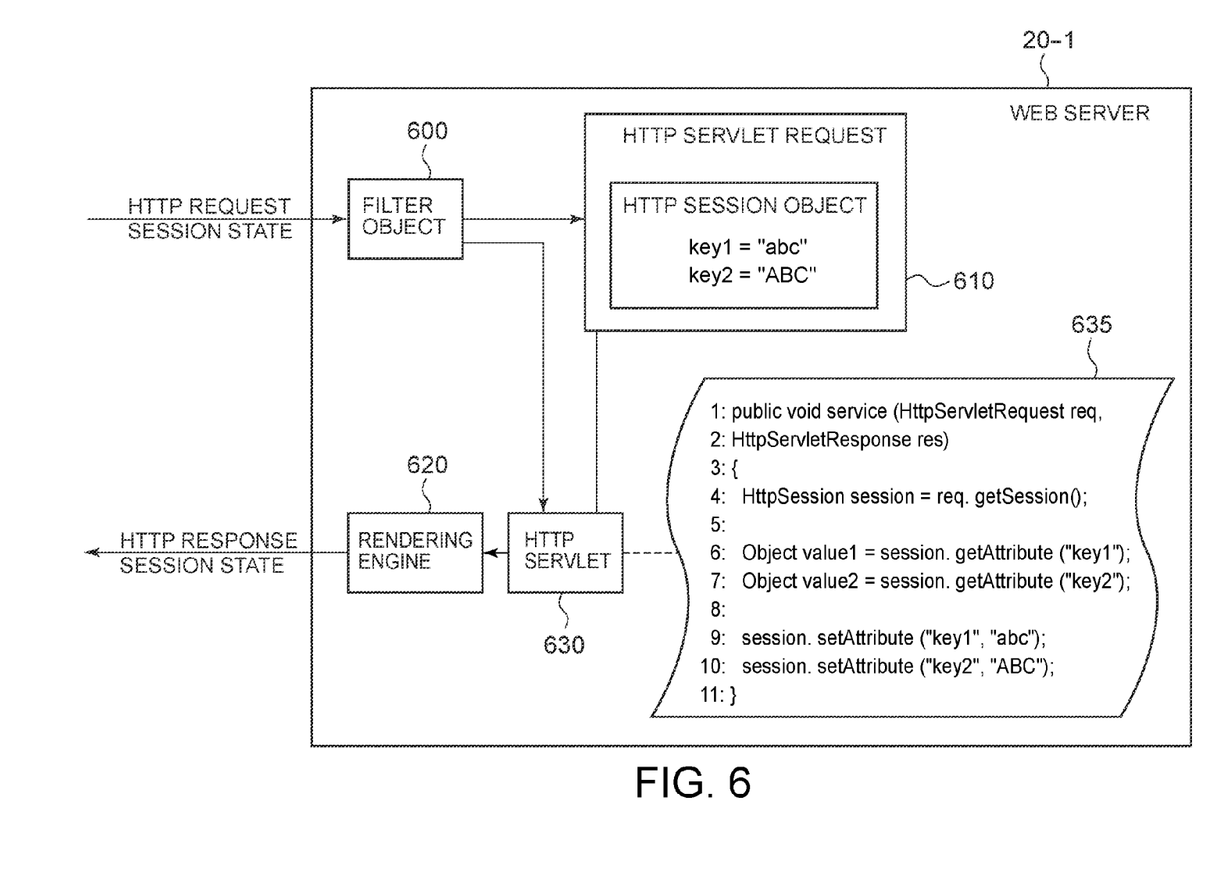
FIG. 6 is a conceptual diagram showing a first configuration of software and data operated on the web server 20-1.

Next, with reference to FIGS. 6 and 7, there will be described an implementation example of a processing function of the web server 20-1 and further detailed variations of the embodiment. FIG. 6 is a conceptual diagram showing a first configuration of software and data operated on the web server 20-1. This first configuration is the configuration wherein all the session states are stored in the terminal device 15 and, for the web server 20-1, the session state is temporarily stored during a short period between the request and the response. According to this configuration, the session state can be operated in the state being stored in the terminal device 15 without substantially altering the servlet program, which has been preliminarily developed on the premise that the session state is stored in the web server 20-1. Hereinbelow, it is schematically described.

The web server 20-1 operates a filter object 600, an HTTP servlet request object 610, and an HTTP servlet 630, on the middleware compliant with JavaEE or the like, for example. The web server 20-1 also operates a rendering engine 620. The filter object 600 is a filter class object of JavaEE, for example, and operates as the storing unit 220 described above. The filter object 600 starts the operation when the reception unit 210 receives the HTTP request, and stores the session state received corresponding to the HTTP request in the storage unit 200.

The storage area, in which the session state is stored, is the area which is accessed as the HTTP session object from the servlet program, as described above. Specifically, the filter object 600 may reserve the storage area for the HTTP session object as one data field of the HTTP servlet request object (the HTTP servlet request object 610 in the drawing) and store the session state in the storage area. In addition, if the storage area for the HTTP session object has already been allocated, the filter object 600 updates the session state which has already been stored in the storage area and stores the received new session state. For example, in FIG. 6, both of two character string variables "key1" and "key2" are the received session states, and the session state which has already been stored before receiving the request is discarded.

In response to the storing of the session state, the execution unit 230 starts the operation to execute a servlet program 635, which is the processing program, and operates as the HTTP servlet 630. As shown in the first line of the servlet program 635, the HTTP servlet request object is referred to by the argument "req" on this program. As shown in the fourth line, by calling the method "getSession" for the "req", the HTTP session object is read from the HTTP servlet request object. This object is referred to as the variable "session" from the servlet program 635.

As shown in the sixth line, by calling the method "getAttribute" for the "session", the value is read from the HTTP session object. The read value is assigned to a variable "value1". Similarly, as shown in the seventh line, by calling the method "getAttribute" by specifying a different key name, a different value is read from the HTTP session object. The read value is assigned to a variable "value2".

As shown in the ninth line, by calling the method "setAttribute" for the "session", the value of the HTTP session object is updated. In this line, the value of the key "key1" is updated to "abc". Similarly, as shown in the tenth line, by calling the method "setAttribute" for the "session", the value of the HTTP session object is updated. In this line, the value of the key "key2" is updated to "ABC".

Incidentally, although FIG. 6 exemplifies a processing part compliant with JavaEE or the like among the servlet program 635, the servlet program 635 may include a page part described in JSP or the like. For this reason, when the operation of the HTTP servlet 630 is completed, the servlet program 635 dispatches the execution to the rendering engine 620, and the rendering engine 620 starts rendering processing of JSP. The rendering processing is the processing to convert HTML tags or attributes described in the servlet program 635 to a Java program which outputs these HTML tags or attributes, and to execute the program.

In this embodiment, the rendering engine 620 also serves as the return unit 250 described above. Namely, the rendering engine 620 reads the session state stored as the HTTP session object from the storage unit 200, and sets it as the parameter in an HTML document after conversion. The session state is set to each form tag of the HTML document constituting the HTTP response. The parameter to be set is the parameter of a hidden tag which is nested in each form tag, and can be expressed as follows, using the form tag and <% tag, as an example. <form . . . > . . . <%=CSHttpServletRequest.render-ClientSession(request) %></form> Here, the tag <% is a command for the rendering processing of JSP, which evaluates the value of an expression corresponding to the tag upon rendering of JSP, and uses an evaluated value as it is as a part of the HTML document. In other words, the rendering engine 620, after preliminarily inserting such a tag <% into a JSP code, performs the rendering of the JSP code to create the HTML document and returns it while including it in the HTTP response.

As for the parameter to be set, it is desirable to be serialized as described above and the conversion including the encryption and data compression is performed. Although there are two session states, key1 and key2, in the example of FIG. 6, the rendering engine 620 may combine these session states to set to the HTTP response as one parameter. Thereby, only one parameter indicating the session state can be used in the following HTTP request, allowing for reducing data size of the HTML document or request message and simplifying the data structure. Incidentally, since each of the web servers 20-2 to N can apply the similar configuration to that of the web server 20-1, the description thereof is omitted.

Figure 7:
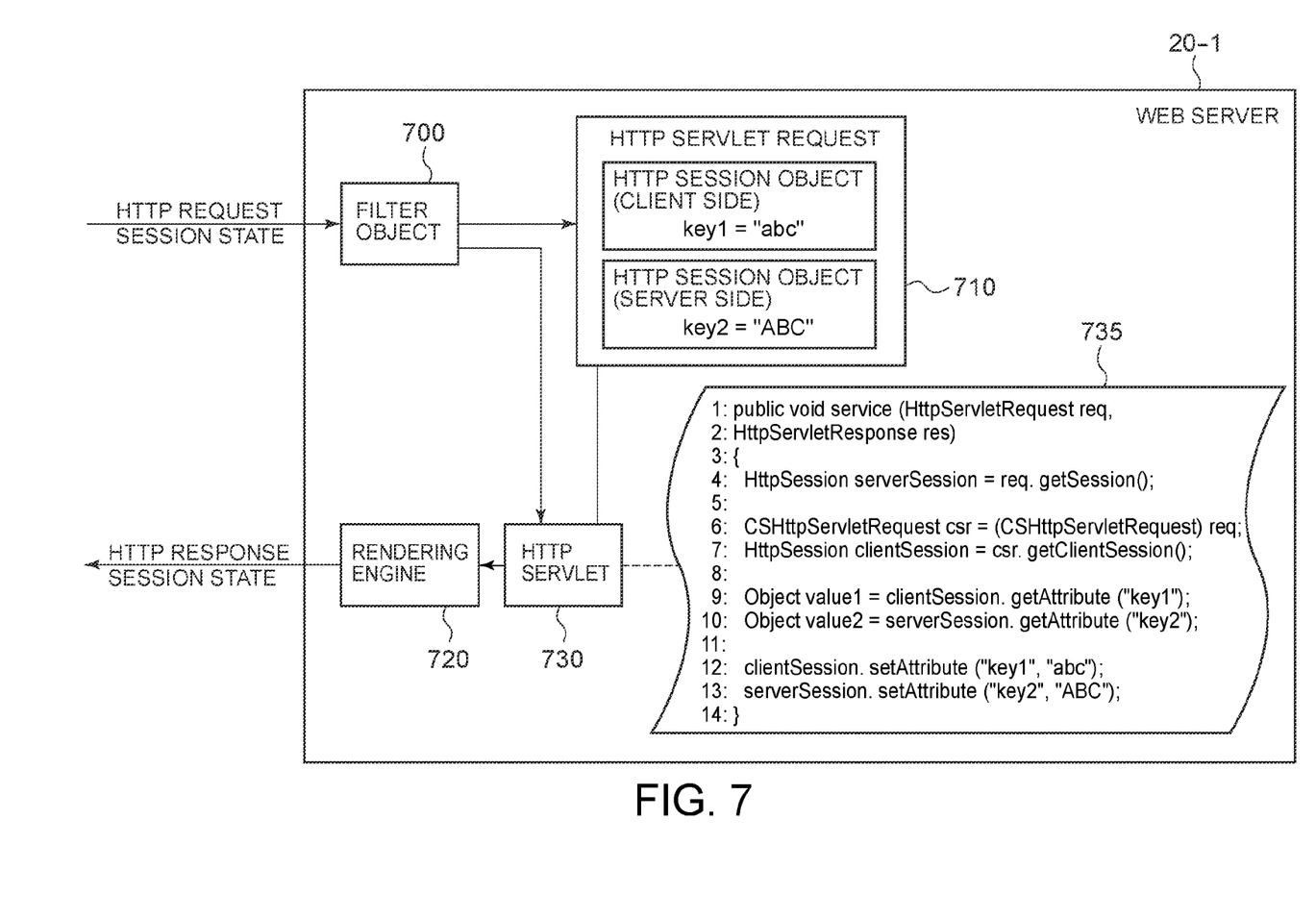
FIG. 7 is a conceptual diagram showing a second configuration of the software and data operated on the web server 20-1.

FIG. 7 is a conceptual diagram showing a second configuration of the software and data operated on the web server 20-1. This second configuration is the configuration which does not store all the session states in the terminal device 15, but enables a storage location to be selected from the terminal device 15 and the web server 20-1 depending on the application of the session state. According to this configuration, it allows to store only the session state with high importance for continuing the processing in the terminal device 15, and to reduce the amount of communication data or processing for maintaining the session. Hereinbelow, it is schematically described.

The web server 20-1 operates a filter object 700, an HTTP servlet request object 710, and an HTTP servlet 730 on a virtual machine, such as JavaEE, for example. The web server 20-1 also operates a rendering engine 720. Similar to the example of FIG. 6, the filter object 700 is the filter class object, and starts the operation as the storing unit 220 when the HTTP request is received. The filter object 700 stores the session state received corresponding to the HTTP request in the storing unit 200. The storage area for storing the session state is the storage area in the HTTP servlet request object 710.

However, the filter object 700 in FIG. 7 is different from the filter object 600, wherein it does not update the session state which has been already stored using the received session state, but stores the received state in addition to the already-stored session state. Specifically, it is as follows. The storage unit 200 stores both of the first and secondary HTTP session objects in the storage area in the HTTP servlet request object 710. The primary HTTP session object is the object which should be stored in the terminal device 15, and uses key1 as the key name in the drawing. The secondary HTTP session object is the object which should be stored in the web server 20-1, and uses key2 as the key name in the drawing.

The filter object 700, when the session state using key1 as the key name is received, stores the session state in the storage area in the HTTP servlet request object 710. At this time, the filter object 700 maintains the session state, which has already been stored using key2 as the key name, without changing it. Then, the execution unit 230 starts the operation, executes a servlet program 735 to operate as the HTTP servlet 730. As shown in the first to fourth lines, by calling the method "getSession" for the HTTP servlet request object, the session state is read as the object of an HTTP session class. The read session state is stored in a variable "serverSession". This processing is similar to that of the example of FIG. 6. However, the session state to be read here is that having the key name "key2".

In contrast, as shown in the sixth to seventh lines, by calling a method "getClientSession" for the HTTP servlet request object, the session state is read as a different object of the HTTP session class. The read session state is stored in a variable "clientSession". Here, the session state having the key name "key1" is read. Incidentally, shown in the sixth line is formal type casting, wherein the entity that the variables "csr" and "req" refer to is identical.

As shown in the ninth to tenth lines, by calling the method "getAttribute" for any of the variables "serverSession" and "clientSession", each of the contents thereof can be distinctively read. As shown in the twelfth to thirteenth lines, by calling the method "setAttribute" for any of these variables, a new value can be distinctively set for each of the objects.

In this manner, in response to the execution of the servlet program 735, the access unit 240 can selectively access each session state stored as the first and secondary HTTP session objects.

Note herein that, although FIG. 7 also exemplifies the processing part compliant with JavaEE or the like among the servlet program 735, as with FIG. 6, the servlet program 735 may include the page part described in JSP or the like. For this reason, when the operation of the HTTP servlet 730 is completed, the servlet program 735 is outputted to the rendering engine 720, and the rendering engine 720 starts the rendering processing of JSP. The rendering engine 720 also serves as the return unit 250 described above. Namely, the rendering engine 720 reads the HTTP session object from the storage unit 200, and sets it in the HTML document after conversion as the parameter. However, in the example of FIG. 7, the return unit 250 reads only the session state stored as the primary HTTP session object, and does not read the session state stored as the secondary HTTP session object. In this manner, a part of the session states is returned to the terminal device 15 in FIG. 7, so that the network traffic or processing load required for maintaining the session can be reduced. Incidentally, since each of the web servers 20-2 to 20-N can apply the similar configuration to that of the web server 20-1, the description thereof is omitted.

Figure 8:
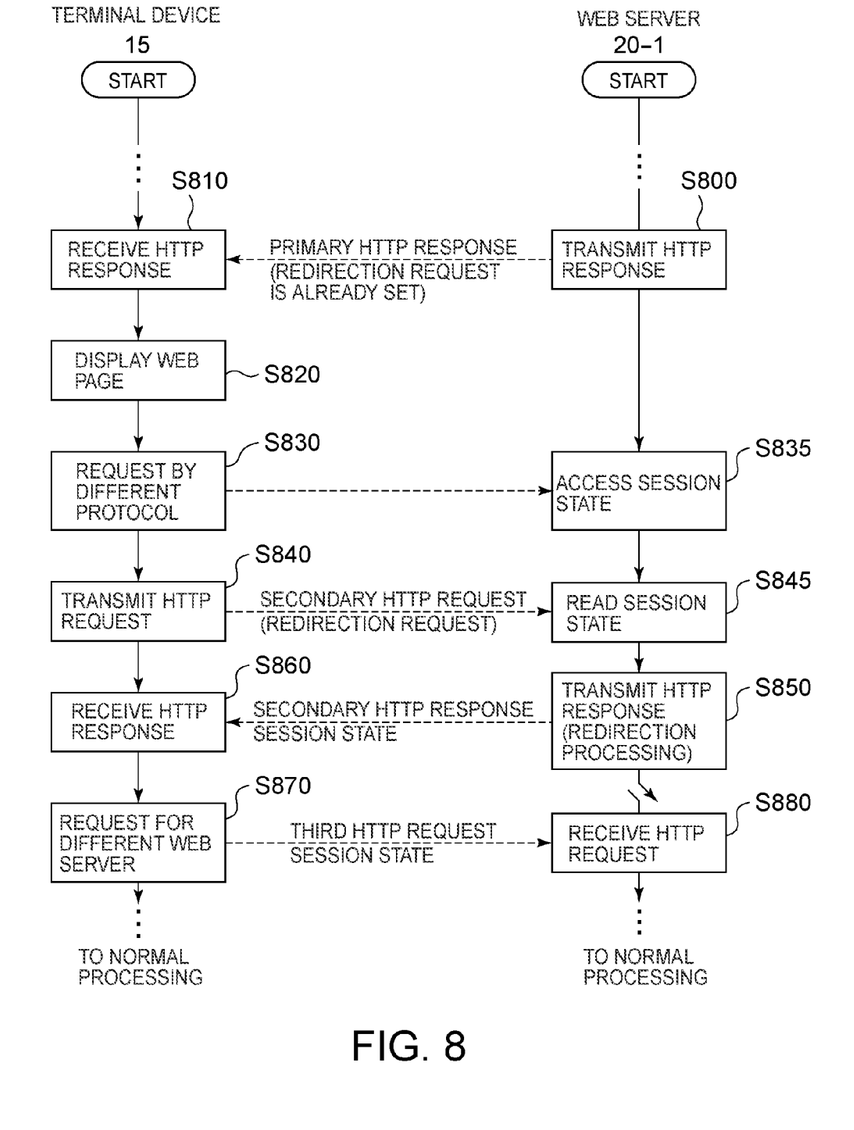
FIG. 8 shows procedure of the web servers 20-1 to N to communicate with the terminal device 15 according to a variation of the embodiment.

FIG. 8 shows procedure of the web servers 20-1 to 20-N to communicate with the terminal device 15 according to a variation of the embodiment. By reference to FIG. 8, the processing procedure in the case where the website applies Ajax is shown as the variation. In this variation, the return unit 250 and the redirection processing unit 260 performs the processing from S800 to S880 in this drawing, instead of the processing from S560 to S510 in FIG. 5. The terminal device 15 performs the processing from S810 to S870 in this drawing, instead of the processing from S570 through S580 to S500 in FIG. 5.

First, the return unit 250 returns the primary HTTP response to the terminal device 15, the primary HTTP response being set to transmit a redirection request as the secondary HTTP request to the redirection processing unit 260 (S800). The destination of this redirection request is not set as an arbitrary web server among the web servers 20-1 to N, but set as the web server 20-1, which is now about to return the primary HTTP response. Corresponding thereto, the terminal device 15 receives the primary HTTP response (S810), and displays the web page in accordance with an indication contained in this response (S820).

The terminal device 15, without the need to explicitly receive the manipulation to transmit the HTTP request, transmits the request by the XMLHTTP communication to the web server 20-1, by the operation of JavaScript which operates on the web page (S830). In response thereto, the access unit 240 accesses the stored session state (S835). The terminal device 15, when the manipulation by the user to transmit the HTTP request is explicitly received, transmits the secondary HTTP request in response thereto (S840). As described at S800, there is preliminarily set in this HTTP request to request the redirection processing to the redirection processing unit 260. For this reason, the redirection processing unit 260 reads the session state from the storage unit 200 in response to this redirection request (S845).

Then, the redirection processing unit 260 sets the session state to the secondary HTTP response corresponding to the secondary HTTP request, as the parameter to be transmitted by the terminal device 15 in association with the following third HTTP request. The redirection processing unit 260 then immediately returns the secondary HTTP response by including the indication to re-transmit the third HTTP request to the different web server.

The terminal device 15, when the secondary HTTP response is received (S860), immediately submits the third HTTP request to the different web server (S870). The third HTTP request is transmitted while the latest session state is associated therewith. For this reason, the web server which has received this can appropriately receives the latest session state while associating it with the HTTP request (S880). The subsequent processing is similar to that of the example described by reference to FIGS. 1 to 7. In other words, this web server performs the processing in accordance with the HTTP request by returning to S520 of FIG. 5.

In this manner, when the website applies Ajax functions, it is possible to read the latest session state by setting the parameter of the HTTP response to request the redirection processing for a transmission source of the response. The web server 20-1, which is requested to perform the redirection processing, sets the latest session state to the HTTP response so as to transmit the session state while associating it with the following HTTP request. Thereby, the different web server, which has received the following HTTP request, can correctly succeed the session.

Figure 9:
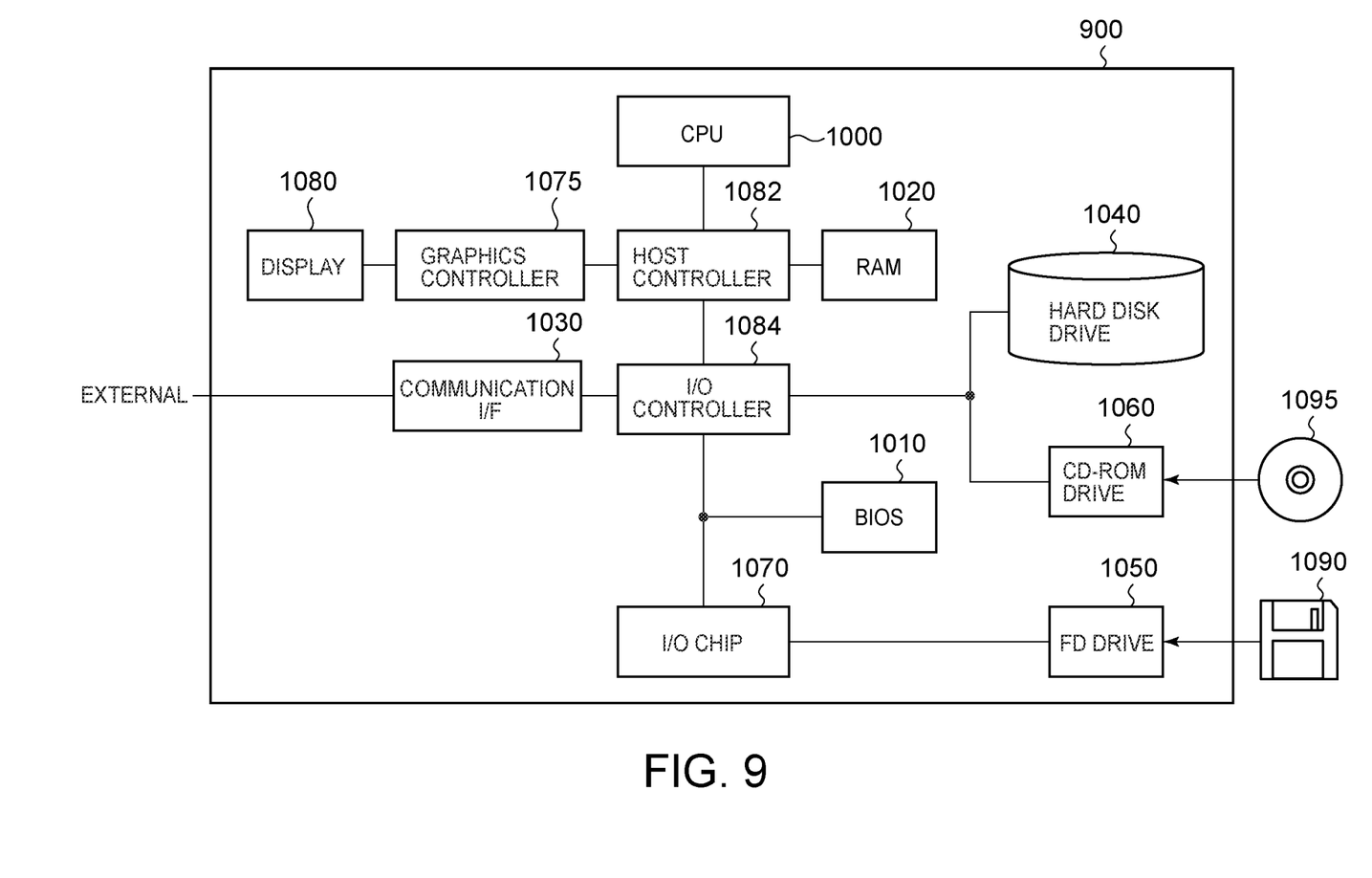
FIG. 9 shows an example of a hardware configuration of an information processor 900 functions as the web server 20-1 in this embodiment or the variation thereof.

FIG. 9 shows an example of a hardware configuration of an information processor 900 functions as the web server 20-1 in this embodiment or the variation thereof. The information processor 900 is provided with a CPU periphery having a CPU 1000, a RAM 1020, and a graphics controller 1075, which are connected with each other via a host controller 1082, an I/O unit having a communication interface 1030, a hard disk drive 1040, and a CD-ROM drive 1060, which are connected to the host controller 1082 via an I/O controller 1084, and a legacy I/O unit having a ROM 1010, a flexible disk drive 1050, and an I/O chip 1070, which are connected to the I/O controller 1084.

The host controller 1082 connects the RAM 1020 with the CPU 1000 for accessing the RAM 1020 with a high transfer rate, and the graphics controller 1075. The CPU 1000 operates based on programs stored in the ROM 1010 and the RAM 1020, and controls each section. The graphics controller 1075 acquires image data, created by the CPU 1000 or the like on a frame buffer provided in the RAM 1020, and displays it on a display 1080. Instead, the graphics controller 1075 may contain the frame buffer therein for storing the image data created by the CPU 1000 or the like.

The I/O controller 1084 connects the host controller 1082 with the communication interface 1030, which is a comparatively high speed I/O device, the hard disk drive 1040, and the CD-ROM drive 1060. The communication interface 1030 communicates with an external apparatus via a network. The hard disk drive 1040 stores the programs and data that the information processing apparatus 900 uses. The CD-ROM drive 1060 reads the program or data from the CD-ROM 1095, and provides it to the RAM 1020 or the hard disk drive 1040.

In addition, the I/O controller 1084 is connected with the ROM 1010, as well as the flexible disk drive 1050 or the I/O chip 1070, which is relatively low-speed I/O device. The ROM 1010 stores a boot program executed by the CPU 1000 at the time of starting of the information processor 900, or the program which depends on the hardware of the information processor 900, or the like. The flexible disk drive 1050 reads the program or data from the flexible disk 1090, and provides it to the RAM 1020 or the hard disk drive 1040 via the I/O chip 1070. The I/O chip 1070 connects the flexible disk 1090 with various kinds of I/O devices via, for example a parallel port, a serial port, a keyboard port, a mouse port, or the like.

The program provided to the information processing apparatus 900 is stored in a recording medium, such as the flexible disk 1090, the CD-ROM 1095, or an IC card, and is provided by the user. The program is read from the recording medium via the I/O chip 1070 and/or the I/O controller 1084, and is installed in the information processing apparatus 900 to be executed. Since the operation which the program causes the information processor 900 or the like to perform is similar to the operation on the web server 20-1 described in FIGS. 1 to 8, the description thereof is omitted.

The program described above may be stored in an external storage medium. The storage medium may include, other than the flexible disk 1090 or the CD-ROM 1095, an optical recording medium, such as a DVD or a PD, a magneto-optical recording medium, such as an MD, a tape medium, or a semiconductor memory, such as an IC card. Moreover, the storage apparatus such as a hard disk, a RAM, or the like, provided in a server system connected to a private telecommunication network or the Internet may be used as the recording medium to provide the program to the information processor 900 via the network.

As described above, according to this embodiment and the variation thereof, the session state can be referred to as the HTTP session object in the servlet program while the entity of the session state can be stored in the terminal device. Thereby, the session state can be distinctively recognized at a glance in the codes of the servlet program, and also the session can be appropriately maintained even in the case where the website is constituted by the plurality of web servers. This increases the efficiency of the development and maintenance of the program, leads to facilitation of the change in the hardware configuration of the website, and enables extremely efficient constitution of the large scale website in recent years.

As mentioned above, the present invention has been described using the embodiments, but the technical scope of the present invention is not limited to the scope described in the aforementioned embodiments. It is obvious to those skilled in the art that various modification or improvement may be added to the aforementioned embodiments. It is clear from the description of claims that such aspects to which modification and the improvement are added can also be included in the technical scope of the present invention.

What is claimed is:

1. A web server comprising:
   a storage unit for storing a session state, the session state indicating progress of processing in response to a primary Hyper Text Transfer Protocol (HTTP) request received from a terminal device;
   a reception unit for receiving the session state associated with the primary HTTP request from the terminal device;
   a storing unit for storing the session state in the storage unit, the session state to be accessed from the storage unit as an HTTP session object by a processing program performing processing in response to receiving the primary HTTP request from the terminal device;
   an access unit for accessing the session state from the storage unit in response to execution of an instruction of the processing program to access the HTTP session object; and
   a return unit for
      accessing the session state from the storage unit in response to execution of an instruction of the processing program to return a primary HTTP response to the terminal device, the primary HTTP response corresponding to the primary HTTP request,
      including the session state with the primary HTTP response, and
      transmitting the primary HTTP response to the terminal device, wherein the session state is to be included by the terminal device with a redirection request in a secondary HTTP request to be processed by a processing program associated with a second web server, the second web server to be different from the web server that processes the first HTTP request, and
      wherein the return unit further comprises a redirection processing unit configured to:
      transmit the primary HTTP response, the primary HTTP response causing the terminal device to request redirection processing as a secondary HTTP request,
      read the session state from the storage unit based on the secondary HTTP request including a redirection processing request,
      set the session state to the secondary HTTP response as a parameter to be transmitted by the terminal device in association with a third HTTP request, and
      transmit the secondary HTTP response, wherein the storing unit stores the received session state in the storage unit based on the third HTTP request having been received.

2. The web server according to claim 1, wherein the session state associated with the primary HTTP request is accessed from the storage area as the HTTP session object, instead of a session state previously stored in the storage area.

3. The web server according to claim 1, wherein:
   the storage unit stores a primary HTTP session object and a secondary HTTP session object in the storage area;
   the storing unit stores the session state associated with the primary HTTP request in the storage unit as the primary HTTP session object;
   the access unit accesses the respective session states stored as the first and secondary HTTP session objects in response to execution of the processing program product; and
   the return unit reads the session state stored as the primary HTTP session object from the storage unit, and includes that session state with the primary HTTP response.

4. The web server according to claim 3, wherein the return unit further causes the storage area that stores the session state to be available to other applications based on the session state being included with the primary HTTP response.

5. The web server according to claim 1, wherein:
   the storage unit is to store a data group that includes first data and second data, the second data referring to the first data using a storage address of the first data, the data group stored as the session state; and
   the return unit is to cause serialization processing to be applied to the data group, wherein the first data is referred to from the second data without using the storage address of the first data, and wherein the return unit is to associate the serialized data group with the primary HTTP response.

6. The web server according to claim 5, wherein the return unit further causes at least one of encryption processing and data compression processing to be applied to the serialized data group and associates the processed serialized data group with the primary HTTP response.

7. The web server of claim 1, wherein the session state indicates the progress of processing by the web server.

8. A system comprising a plurality of web servers and a dispatcher device for selectively assigning a Hyper Text Transfer Protocol (HTTP) request received from a terminal device to any of the web servers, each web server comprising:
   a storage unit for storing a session state that indicates progress of processing in response to a plurality of HTTP requests sequentially received from the terminal device;
   a reception unit for receiving the session state in association with a primary HTTP request from the terminal device, in response to assignment by the dispatcher device;
   a storing unit for storing the received session state in a storage area within the storage unit, which is accessed as an HTTP session object by a processing program performing processing in response to the received primary HTTP request, wherein the processing program is associated with a first web server;
   an access unit for accessing the stored session state in response to execution of an instruction to access the HTTP session object, contained in the processing program; and
   a return unit for reading the session state from the storage unit in response to execution of an instruction to return a primary HTTP response, which is contained in the processing program, setting the session state to the primary HTTP response as a parameter to be transmitted by the terminal device in association with a secondary HTTP request, and returning the set primary HTTP response to the terminal device, and wherein the return unit further comprises a redirection processing unit configured to:
   transmit the primary HTTP response, the primary HTTP response causing the terminal device to request redirection processing as the secondary HTTP request,
   read the session state from the storage unit based on the secondary HTTP request including a redirection processing request,
   set the session state to the secondary HTTP response as a parameter to be transmitted by the terminal device in association with a third HTTP request, and
   transmit the secondary HTTP response, wherein the storing unit stores the received session state in the storage unit based on the third HTTP request having been received,
   wherein the session state is to be included by the terminal device with a redirection request in a secondary HTTP request to be processed by a processing program associated with a second web server, the second web server to be different from the web server that processes the first HTTP request.

9. A method of performing processing in response to a Hyper Text Transfer Protocol (HTTP) request received from a terminal device, in a web server comprising a storage unit for storing a session state which indicates progress of processing in response to a plurality of HTTP requests sequentially received from the terminal device, the method comprising the steps of:
   receiving the session state in association with a primary HTTP request from the terminal device;
   storing the received session state in a storage area within the storage unit, which is accessed as an HTTP session object by a processing program performing processing in response to the received primary HTTP request, wherein the processing program is associated with a first web server;
   accessing the stored session state in response to execution of an instruction to access the HTTP session object, contained in the processing program;
   reading the session state from the storage unit in response to execution of an instruction to return a primary HTTP response, which is contained in the processing program, setting the primary HTTP response as a parameter to be transmitted by the terminal device in association with a secondary HTTP request, and returning the set primary HTTP response to the terminal device, wherein the session state is to be included by the terminal device with a redirection request in a secondary HTTP request to be processed by a processing program associated with a second web server, the second web server to be different from the web server that processes the first HTTP request;
   transmitting the primary HTTP response, the primary HTTP response causing the terminal device to request redirection processing as the secondary HTTP request,
   reading the session state from the storage unit based on the secondary HTTP request including a redirection processing request,
   setting the session state to the secondary HTTP response as a parameter to be transmitted by the terminal device in association with a third HTTP request, and
   transmitting the secondary HTTP response, wherein the storing unit stores the received session state in the storage unit based on the third HTTP request having been received.

10. A computer program stored on a non-transitory computer readable storage medium for causing an information processor to function as:
   a storage unit for storing a session state which indicates progress of processing in response to a plurality of Hyper Text Transfer Protocol (HTTP) requests sequentially received from the terminal device;
   a reception unit for receiving the session state in association with a primary HTTP request from the terminal device;
   a storing unit for storing the received session state in a storage area within the storage unit, which is accessed as an HTTP session object by a processing program performing processing in response to the received primary HTTP request, wherein the processing program is associated with a first web server;
   an access unit for accessing the stored session state in response to execution of an instruction to access the HTTP session object, contained in the processing program; and
   a return unit for reading the session state from the storage unit in response to execution of an instruction to return a primary HTTP response, which is contained in the processing program, setting the session state to the primary HTTP response as a parameter to be transmitted by the terminal device in association with a secondary HTTP request, and returning the set primary HTTP response to the terminal device, wherein the session state is to be included by the terminal device with a redirection request in a secondary HTTP request to be processed by a processing program associated with a second web server, the second web server to be different from the web server that processes the first HTTP request, and wherein the return unit further comprises a redirection processing unit configured to:

transmit the primary HTTP response, the primary HTTP response causing the terminal device to request redirection processing as the secondary HTTP request, read the session state from the storage unit based on the secondary HTTP request including a redirection processing request, set the session state to the secondary HTTP response as a parameter to be transmitted by the terminal device in association with a third HTTP request, and transmit the secondary HTTP response, wherein the storing unit stores the received session state in the storage unit based on the third HTTP request having been received.

* * * * *